United States Patent [19]

Smith

[11] Patent Number: 4,459,045

[45] Date of Patent: * Jul. 10, 1984

[54] GAMMA THERMOMETER WITH ZIRCALOY BARRIER

[75] Inventor: Robert D. Smith, Bethesda, Md.

[73] Assignee: Scandpower, Inc., Bethesda, Md.

[*] Notice: The portion of the term of this patent subsequent to Nov. 3, 1998 has been disclaimed.

[21] Appl. No.: 229,745

[22] Filed: Jan. 29, 1981

[51] Int. Cl.³ .......................... G21C 17/00; G01J 5/04
[52] U.S. Cl. ...................................... 374/132; 376/247
[58] Field of Search ............ 73/355 R; 374/132, 208, 374/179; 376/247, 331

[56] References Cited

U.S. PATENT DOCUMENTS

| | | | |
|---|---|---|---|
| 3,067,604 | 12/1962 | Brunson | 73/1 F |
| 3,077,539 | 2/1963 | Blau, Jr. et al. | 73/1 F X |
| 3,411,987 | 11/1968 | Fitzpatrick | 376/247 X |
| 3,539,400 | 11/1970 | Pustell | 374/208 |
| 3,560,282 | 2/1971 | Stark | 136/230 X |
| 3,627,633 | 12/1971 | Magladry | 376/247 X |
| 3,923,552 | 12/1975 | Parris | 374/178 X |
| 4,136,553 | 1/1979 | Jones | 376/247 |
| 4,298,430 | 11/1981 | Rolstad et al. | 376/247 |
| 4,313,792 | 2/1982 | Smith | 376/247 |

FOREIGN PATENT DOCUMENTS

| | | | |
|---|---|---|---|
| 3022059 | 12/1980 | Fed. Rep. of Germany | 376/247 |
| 2420827 | 3/1979 | France | 376/247 |

OTHER PUBLICATIONS

Gamma Thermometer Developments for Light Water Reactors, IEEE Transactions on Nuclear Science, vol. N.S. 26, No. 1, Feb. 1979.

Primary Examiner—Daniel M. Yasich
Attorney, Agent, or Firm—Eric P. Schellin

[57] ABSTRACT

Zircaloy metal is utilized to form the heat generating core and internal lining of a high strength pressure barrier for a gamma thermometer. The internal lining which is cross-sectionally smaller than the core, forms a hydrogen gas barrier to prevent deterioration of the low thermal conductivity of the thermal resistance region in the thermometer.

1 Claim, 3 Drawing Figures

GAMMA THERMOMETER WITH ZIRCALOY BARRIER

BACKGROUND OF THE INVENTION

This invention relates to an improvement in gamma thermometers utilized in the high pressure environment of a pressure water type of nuclear reactor, including but not necessarily limited to gamma thermometers of the type disclosed in prior copending application Ser. No. 888,881, filed Mar. 21, 1978, now U.S. Pat. No. 4,298,430 to Rolstad et al. owned in common with the present application by the same assignee.

Both gamma thermometers of the foregoing type as well as conventional gamma thermometers operate on the principle of generating heat within an internal heater body or core in response to its absorption of gamma radiation, the heat so generated being transmitted along controlled heat flow paths to a heat sink. Such heat flow produces a temperature rise that is measurable and substantially proportional to the rate at which radiation is being absorbed. The temperature measurement is made by an electrical signal producing sensor such as a thermocouple, the output signal of which may deviate from linear proportionality depending on the temperature insensitivity of the thermally conductive materials utilized and the amount of heat leakage along secondary paths other than the principal controlled heat paths. Attempts have been made to prevent uncontrolled escape of heat along paths established by infra-red radiation and by gas conduction from the heater body or the sensor. Thus, radiating heat losses are minimized by thermometer operation within limited temperature ranges. Within light water moderated reactors, for example, sensor temperatures are maintained below 450° C. so that radiation losses are an insignificant fraction of the total heat flow rate. Minimizing heat losses arising through gas conduction, however, presents a more difficult problem.

In attempting to reduce the gas conduction losses through thermal resistance regions of a gamma thermometer, such regions have been evacuated to a high vacuum level. However, the signal output of the gamma thermometer in such cases exhibited a change with time. Accordingly, a fill gas having a low thermal conductivity was utilized in the thermal resistance region. Although a stable signal output was obtained in the latter case, a substantial proportion of the heat leaked by means of gas conduction. Further, in utilizing a fill gas to avoid signal change with time changes in ambient temperature has produced an undesirable output signal change.

It was discovered that the gas conduction losses in gamma thermometers resulted from hydrogen gas contamination of the thermal resistance regions, such as the evacuated or gas filled chambers of conventional gamma thermometers or the axial gaps in the heat generating body of gamma thermometers of the type disclosed in the prior application aforementioned. Such hydrogen contamination results from the use of austenitic stainless steels or chrome nickel alloy metals, such as Iconel, which are permeable to molecules of hydrogen gas. Further, in the presence of high vacuum, such metals undergo a degassing process so that evacuated regions of a gamma thermometer in a reactor rapidly acquire hydrogen gas molecules to drastically raise the thermal conductivity of the evacuated region. In connection with gas filled regions of a gamma thermometer, thermal conductance thereof is also significantly altered by the introduction of hydrogen gas thereto.

A zirconium alloy metal known by the trade name Zircaloy and commonly utilized for reactor core construction because it exhibits a low parasitic capture rate of thermal neutrons is marketed by the Specialty Metals Division of the Westinghouse Electric Corporation. This metal also has all the necessary thermal properties for construction of the inner core or heat generating body of gamma thermometers. In addition, oxidized surfaces of Zircaloy are relatively impermeable to hydrogen gas and the material itself absorbs hydrogen molecules at high temperatures to form zirconium hydride. However, as a relatively thin housing or pressure barrier, Zircaloy is unsuitable for the long term stress conditions of a pressure water reactor because of its relatively low structural strength.

It is therefore an important object of the present invention to provide a gamma thermometer within which hydrogen contamination of its thermal resistance regions is minimized by use of Zircaloy, and yet maintain the pressure isolation of such regions from its reactor environment within the dimensional limitations imposed by such installation.

SUMMARY OF THE INVENTION

In accordance with the present invention the pressure barrier of a gamma thermometer enclosing one or more thermal resistance regions as well as the inner core, is constructed with an outer portion made of stainless steel or Iconel and a relatively thin internal lining of Zircaloy. The thermal resistance region is formed by the chamber of a conventional gamma thermometer or one axial gap in the core of a gamma thermometer of the type disclosed in the aforementioned prior application. Further, the inner core or heat generating body of the thermometer is also made of Zircaloy.

The double layer construction of the pressure barrier provides the required strength for conditions within the fuel rod assembly of a pressure water reactor and within the dimensional restrictions of such an installation. The internal lining of the pressure barrier made of Zircaloy having a smaller cross-sectional area than that of the Zircaloy Core, prevents hydrogen gas contamination of the thermal resistance region either as an evacuated space or a gas filled space.

BRIEF DESCRIPTION OF DRAWING FIGURES

DETAILED DESCRIPTION OF PREFERRED EMBODIMENTS

Figure 1:
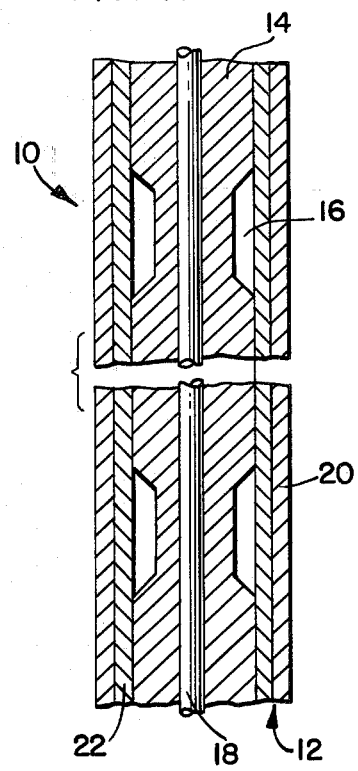
FIG. 1 is a partial side section view of an improved gamma thermometer in accordance with one embodiment of the invention.

Referring now to the drawings in detail FIG. 1 illustrates a gamma thermometer of the type disclosed in prior copending application Ser. No. 888,881, aforementioned, generally referred to herein by reference numeral 10. The gamma thermometer is positioned within a high pressure environment, such as the fuel rod assembly of a pressure water type of nuclear reactor and accordingly includes an outer tubular pressure barrier generally referred to by reference numeral 12. Protectively enclosed within the tubular pressure barrier is a gamma radiation absorbing body 14, in the form of an elongated monolithic core within which heat is generated. The body 14 has a constant diameter cylindrical shape, interrupted at axially spaced measurement zones by reduced diameter sections forming thermal resistance gaps 16. A multiple junction thermocouple cable 18 is mounted within a central bore of the body to supply differential temperature signals reflecting the local heat flow rates at the measurement zones. The thermal resistance gaps 16 are either evacuated or filled with a gas, such as argon, to provide a relatively low thermal conductivity region as compared to the high thermal conductivity of the body 14.

In order to retain the high vacuum within the resistance gaps or to prevent any loss of low thermal conductivity afforded by a fill gas if utilized, the tubular pressure barrier 12 is made of a special construction in accordance with the present invention. The tubular pressure barrier includes an outer portion 20 of a material such as stainless steel or Iconel having the requisite structural strength properties to support the gamma thermometer and protect its interior from the high pressure environment. However, such outer portion is generally permeable to hydrogen gas and sometimes subject to hydrogen degassing under high temperature conditions which heretofore accounts for thermal deterioration in the resistance gaps. A hydrogen gas barrier 22 in the form of a thin sleeve made of hydrogen gas impermeable material such as Zircaloy is provided as an inner portion of the tubular barrier 12 in enclosing relation to the resistance gaps 16. Although the sleeve 22 itself is ordinarily unsuitable in long term, high stress installations, in association with the outer portion 20 of the tubular barrier it was found to be acceptable. The Zircaloy material of the sleeve has all of the desirable properties for either retention of vacuum in the resistance gaps or prevention of hydrogen gas contamination of fill gas if utilized, since the Zircaloy absorbs any hydrogen that may permeate through outer portion 20.

Figure 2:
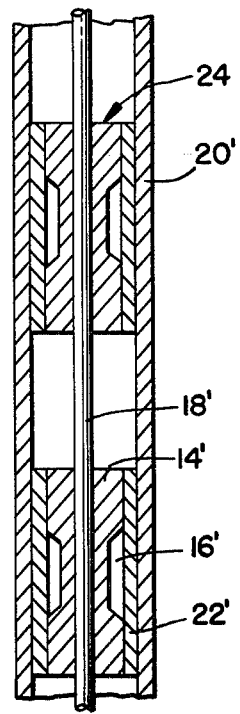
FIG. 2 is a partial side section view illustrating another embodiment.

In accordance with another embodiment of the invention as shown in FIG. 2, a continuous tubular jacket 20' made of stainless steel or Iconel forms an outer pressure barrier for a plurality of axially spaced measurement zones 24 supported therein forming a gamma radiation absorbing body. The measurement zones are interconnected by a common multiple junction thermocouple cable 18'. The measurement zones being interconnected only by the cable 18', are unable to exert large forces on the jacket 20' because of differences in thermal coefficients of expansion, and yet are in good thermal contact with the jacket. Each zone has a Zircaloy body 14' formed with a resistance gap 16'. The gap is enclosed by a thin Zircaloy sleeve 22' acting as the hydrogen gas barrier to provide immunity to hydrogen deterioration of the thermal resistance of the gap.

Figure 3:
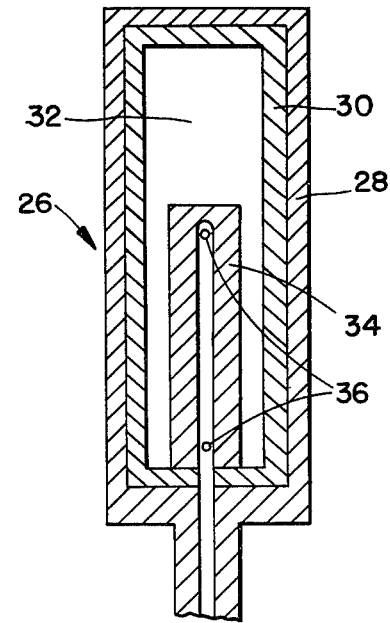
FIG. 3 is a side section view through a conventional type of gamma thermometer illustrating yet another embodiment of the present invention.

According to the embodiment shown in FIG. 3, a gamma thermometer 26 includes an outer pressure barrier 28 made of stainless steel or Iconel and internally lined by a Zircaloy hydrogen barrier 30 to provide the necessary strength and immunity to hydrogen deterioration of a low thermal conductivity chamber 32. The chamber is either evacuated or filled with a gas having a low thermal conductivity property. Positioned within the chamber is a gamma radiation absorbing heat generating body 34 made of Zircaloy. A double junction thermocouple 36 is embedded in the body 34. Except for the construction of the enclosure, the thermometer 26 is a conventional type.

In each of the described embodiments, the Zircaloy lining forms the hydrogen gas impermeable barrier. Although the Zircaloy barrier has a relatively small cross-sectional area as compared to the heat generating core, together with the outer portion of the pressure barrier forms a structurally adequate assembly despite the dimensional limitations of the reactor installation with which the invention is associated.

What is claimed is:
1. A gamma thermometer assembly for a high pressure environment comprising:
  (a) at least one gamma thermometer, including a gamma radiation absorbing body of cylindrical shape interrupted at axially spaced measurement zones by reduced diameter sections forming thermal resistance gaps, including a multiple junction thermocouple cable mounted within a central bore in said body to supply differential temperature signals reflecting the local heat flow rates at said measurement zones;
  (b) a pressure barrier of Iconel of sufficient thickness to provide structural strength encompassing said gamma thermometers; and
  (c) a hydrogen barrier of zircaloy of sufficent thickness to block the passage of hydrogen said hydrogen barrier between said pressure barrier and said gamma thermometer, said hydrogen barrier encompassing said gamma thermometer.

* * * * *